US008599820B2

(12) United States Patent
Thompson

(10) Patent No.: US 8,599,820 B2
(45) Date of Patent: Dec. 3, 2013

(54) APPARATUS AND METHOD FOR COMMUNICATION

(75) Inventor: Steven Thompson, Forest, VA (US)

(73) Assignee: Anite Finland Oy, Oulu (FI)

( * ) Notice: Subject to any disclaimer, the term of this patent is extended or adjusted under 35 U.S.C. 154(b) by 283 days.

(21) Appl. No.: 13/236,092

(22) Filed: Sep. 19, 2011

(65) Prior Publication Data

US 2012/0071154 A1    Mar. 22, 2012

Related U.S. Application Data

(60) Provisional application No. 61/384,990, filed on Sep. 21, 2010, provisional application No. 61/387,142, filed on Sep. 28, 2010.

(51) Int. Cl.
*H04B 7/212* (2006.01)
(52) U.S. Cl.
USPC .......................................... 370/347
(58) Field of Classification Search
None
See application file for complete search history.

(56) References Cited

U.S. PATENT DOCUMENTS

| 6,233,550 | B1 * | 5/2001 | Gersho et al. | 704/208 |
| 2001/0023396 | A1 * | 9/2001 | Gersho et al. | 704/220 |
| 2006/0125817 | A1 * | 6/2006 | He | 345/213 |
| 2006/0133547 | A1 * | 6/2006 | He | 375/346 |

FOREIGN PATENT DOCUMENTS

WO    2006/085275 A1    8/2006

OTHER PUBLICATIONS

European Search Report.
K.E. Nolan, et al.; "Modulation Scheme Classification for 4G Software Radio Wireless Networks"; http://www.scss.tcd.ie/{omahony/nolan_IASTED.pdf>; p. 28; paragraph 4.A-4.B.
Hendra Setiawan ,et al.; "Common Wireless Communication Services Recognition for GSM, UMTS and LTE Via Synchronization Channels Detection"; Communications and Information Technology; 2009; pp. 1280-1285.

* cited by examiner

*Primary Examiner* — Hassan Phillips
*Assistant Examiner* — Prenell Jones
(74) *Attorney, Agent, or Firm* — Duane Morris LLP

(57) ABSTRACT

Apparatus and method for recognizing Global System for Mobile communication (GSM) signals are provided. The solution comprises obtaining as an input a sampled signal; determining the $8^{th}$ order moment for a group of samples of the input signal corresponding to the length of one or two frames of a GSM signal; determining peak to average power and peak to average power variance for the group of samples of the input signal corresponding to the length of one or two frames of a GSM signal; comparing the obtained $8^{th}$ order moment to predetermined thresholds and the obtained peak to average power and peak to average power variance to predetermined thresholds; determining whether the input signal is a GSM-type signal on the basis of the comparisons.

10 Claims, 5 Drawing Sheets

APPARATUS AND METHOD FOR COMMUNICATION

The instant application claims priority from the co-pending U.S. provisional Patent Applications No. 61/384990, entitled "Method for increasing GSM BSIC blind scan performance", filed Sep. 21, 2010, and No. 61/387142, entitled "System and method for identifying a signal as GSM like", filed Sep. 28, 2010 the entirety of which are incorporated herein by reference.

FIELD

The exemplary and non-limiting embodiments of the invention relate generally to wireless communication networks. Embodiments of the invention relate especially to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Because frequency spectrum is a limited resource, several communication systems may share the same spectrum. In a given frequency spectrum a given number of frequency bands may be given to different system utilizing different access methods. For example, GSM signals may share the spectrum with CDMA, EVDO, WCDMA, LTE and/or WiMAX signals. GSM stands for Global System for Mobile communication, CDMA for Code Division Multiple Access, EVDO for Evolution-Data Optimized, WCDMA for Wideband Code Division Multiple Access, LTE for Long Term Evolution and WiMAX for Worldwide Interoperability for Microwave Access. These are different communication systems or access methods.

A receiver or a scanner given the task of finding available channels of a given communication system should be able to scan the desired frequency spectrum as fast as possible. As the frequency spectrum may comprise channels of different system the task is challenging. This applies not only to receivers but scanners.

The current state-of-the-art in GSM Base Station Identity Code BSIC scanner technology provides a performance level which is normally adequate when a follow-phone mode of operation is used. In follow-phone mode only one to three GSM channels may be scanned periodically, typically a few times a second. However, when a full-band 850 MHz or 1900 MHz GSM BSIC scan is desired or a multi-technology scan is desired the scan rates are too slow. For example, a full-band scan in the PCS1900 band of 300 channels taking more than 5 seconds is considered too long. There is a need for faster GSM BSIC scanning using simple tasking of the scanner technology. Simple tasking of scanning all channels in the bands would provide the user with a quick way to configure the scanner without regard to the different cellular signal types and would basically automate the process for the user.

In addition, a multi-technology scanner needs to be able to scan all technologies at fast speeds and very efficiently in the dense cellular environment of mixed technologies.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus comprising at least one processor configured to cause the apparatus: obtain as an input a sampled signal; determine the $8^{th}$ order moment for a group of samples of the input signal corresponding to the length of one or two frames of a Global System for Mobile communication (GSM) signal; determine peak to average power and peak to average power variance for the group of samples of the input signal corresponding to the length of one or two frames of a GSM signal; compare the obtained $8^{th}$ order moment to predetermined thresholds and the obtained peak to average power and peak to average power variance to predetermined thresholds; determine whether the input signal is a GSM-type signal on the basis of the comparisons.

According to another aspect of the present invention, there is provided a method for recognizing Global System for Mobile communication (GSM) signals, the method comprising: obtaining as an input a sampled signal; determining the $8^{th}$ order moment for a group of samples of the input signal corresponding to the length of one or two frames of a GSM signal; determining peak to average power and peak to average power variance for the group of samples of the input signal corresponding to the length of one or two frames of a GSM signal; comparing the obtained $8^{th}$ order moment to predetermined thresholds and the obtained peak to average power and peak to average power variance to predetermined thresholds; determining whether the input signal is a GSM-type signal on the basis of the comparisons.

According to an aspect of the present invention, there is provided a computer program product embodied on a distribution medium readable by a computer and comprising program instructions which, when loaded into an apparatus, execute a computer process comprising: obtaining as an input a sampled signal; determining the $8^{th}$ order moment for a group of samples of the input signal corresponding to the length of one or two frames of a GSM signal; determining peak to average power and peak to average power variance for the group of samples of the input signal corresponding to the length of one or two frames of a GSM signal; comparing the obtained $8^{th}$ order moment to predetermined thresholds and the obtained peak to average power and peak to average power variance to predetermined thresholds; determining whether the input signal is a GSM-type signal on the basis of the comparisons.

LIST OF DRAWINGS

Embodiments of the present invention are described below, by way of example only, with reference to the accompanying drawings, in which FIG. 1 illustrates an example of a communication environment;

DESCRIPTION OF SOME EMBODIMENTS

Embodiments are applicable to any base station, user equipment (UE), server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) based on IEEE 802.11 stardard, worldwide interoperability for microwave access (WiMAX), personal communications services (PCS) and systems using ultra-wideband (UWB) technology. IEEE refers to the Institute of Electrical and Electronics Engineers.

Figure 1:
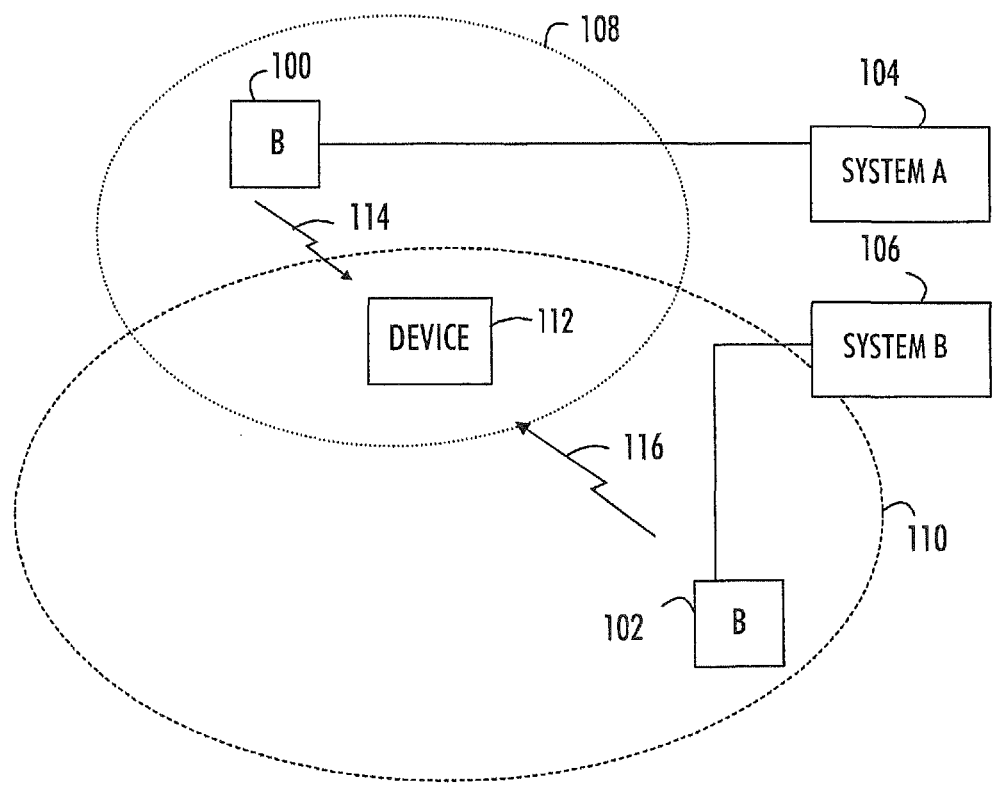

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

FIG. 1 shows two base stations 100, 102 of communication systems 104 and 106. The base stations have coverage areas 108, 110 where the transmissions of the base stations are well received.

In this example, the communication system 104 is a GSM based system and the base station 106 may be a based on another access method such as CDMA, EVDO or WCDMA. In GSM based systems, the base stations transmit a base station identification code BSIC which identifies the base station. Transceivers wishing to communicate with base stations detect the BSIC of the base stations before initiating communication with the base stations.

FIG. 1 shows an apparatus 112 configured to receive the transmissions of the base stations. In this particular example, the apparatus 112 is so situated that it may receive the transmission 114 from base station 100 and the transmission 116 from base station 102. It should be noted that embodiments of the invention are not limited to any particular number of base stations. All base stations may transmit using the same frequency band.

The apparatus may be user equipment, mobile station, a fixed station, a portable or fixed communication apparatus, a measurement or analyzing device, a scanner or any other kind of device configured to receive transmissions from base stations of communication systems. The apparatus may be a standalone device or it may be connectable to other devices such as personal computers, analyzers or other devices.

In an embodiment, the apparatus 112 is a software defined radio SDR. In SDR, many components traditionally implemented with hardware are realized as software running in one or more processors.

The prior art in software defined digital receivers utilizes pre-determined frequency scan lists to optimize scanning speed. The fewer channels that are scanned the faster the scans can be completed. This requirement places an unnecessary burden on the user and can lead to a loss of valuable information with changing network plans since valid GSM channels which may be present will not be scanned. Also, should some of the frequencies or channels have strong cellular signals which are not GSM, a longer processing cycle will occur since the assumption is all signals will be GSM.

In prior art, the process for GSM BSIC decoding requires detecting the Frequency Correction Channel FCCH and synchronization channel SCH bursts. These bursts occur every 11 frames on the forward or downlink control channel. For a BSIC decoding of a GSM signal at least 11 GSM frames must be collected to ensure the reception of at least one FCCH burst and one SCH burst. The process used to locate the SCH bursts is a correlation against the unique SCH training sequence. Typical scanning algorithms provide symbol synchronization with the number of samples per symbol ranging from 2 to 8.

A novel approach to dramatically increase GSM BSIC scan times in a digital receiver is proposed. The performance improvement achieved is more than five times compared current approaches. The solution utilizes using a pre-processing stage combined with a modulation recognition algorithm. The proposed solution is able to automatically sort out GSM signals from non-GSM signals with a probability of 95% or better. The solution employs an 8th order moment along with additional processing computed on one or two frames of collected samples of a received signal in a 200 kHz bandwidth. The 8th order moment along with constant modulus peak-to-average power (PAPR) ratios and synchronous averaging in combination with pre-determined static and/or dynamic thresholds and decision making are used to accept and reject signals as GSM-like.

The short one or two frames of collected data versus the full 11 frames necessary to acquire at least one FCCH and SCH burst greatly reduces time spent when scanning a full band of channels. In the case of a mixed cellular environment there typically exist large sections of the band where there are no GSM signals. These bands can be rapidly scanned without spending time acquiring 11 frames of data for every channel. In sections of the band where GSM signals are detected the 11 frame acquisition can occur and BSIC decoding performed. Overall performance improvement scales up based on the number of non-GSM signals to real-GSM and the total number of channels scanned.

Figure 2:
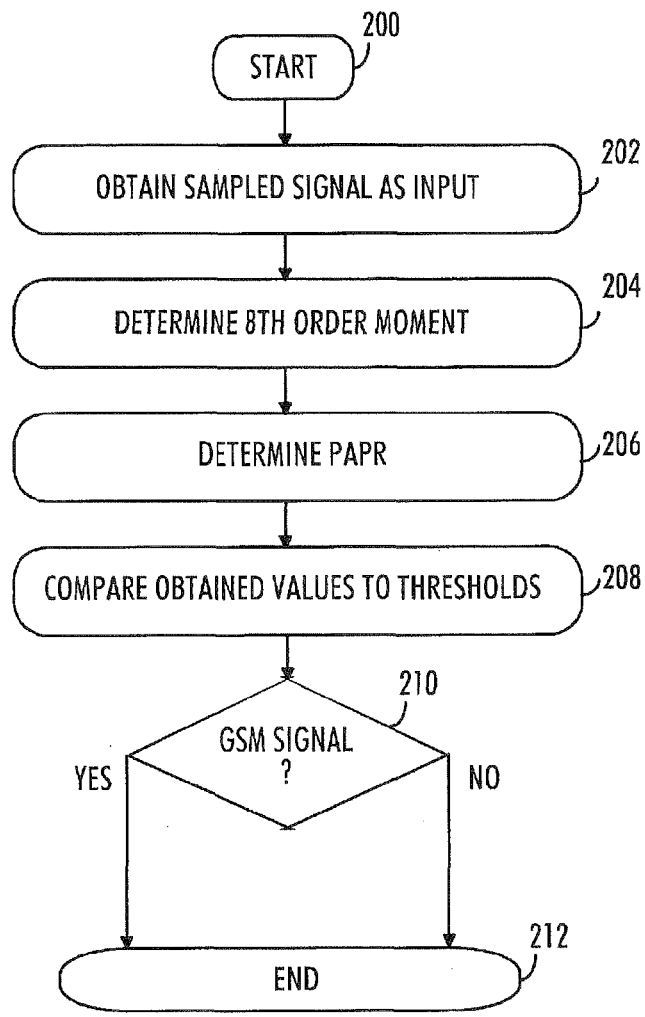
FIGS. 2 and 3 are flowcharts illustrating embodiments of the invention.

FIG. 2 is a flowchart illustrating an embodiment of the invention. The embodiment starts at step 200.

In step 202, a sampled signal is obtained as an input a sampled signal.

In step 204, $8^{th}$ order moment is determined for a group of samples of the input signal corresponding to the length of one or two frames of a Global System for Mobile communication (GSM) signal.

In step 206, peak to average power and peak to average power variance are determined for the group of samples of the input signal corresponding to the length of one or two frames of a GSM signal.

In step 208, the obtained $8^{th}$ order moment is compared to predetermined thresholds and the obtained peak to average power and peak to average power variance to predetermined thresholds.

In step 210, it is determined whether the input signal is a GSM-type signal on the basis of the comparisons.

The process ends in step 212.

Figure 3:
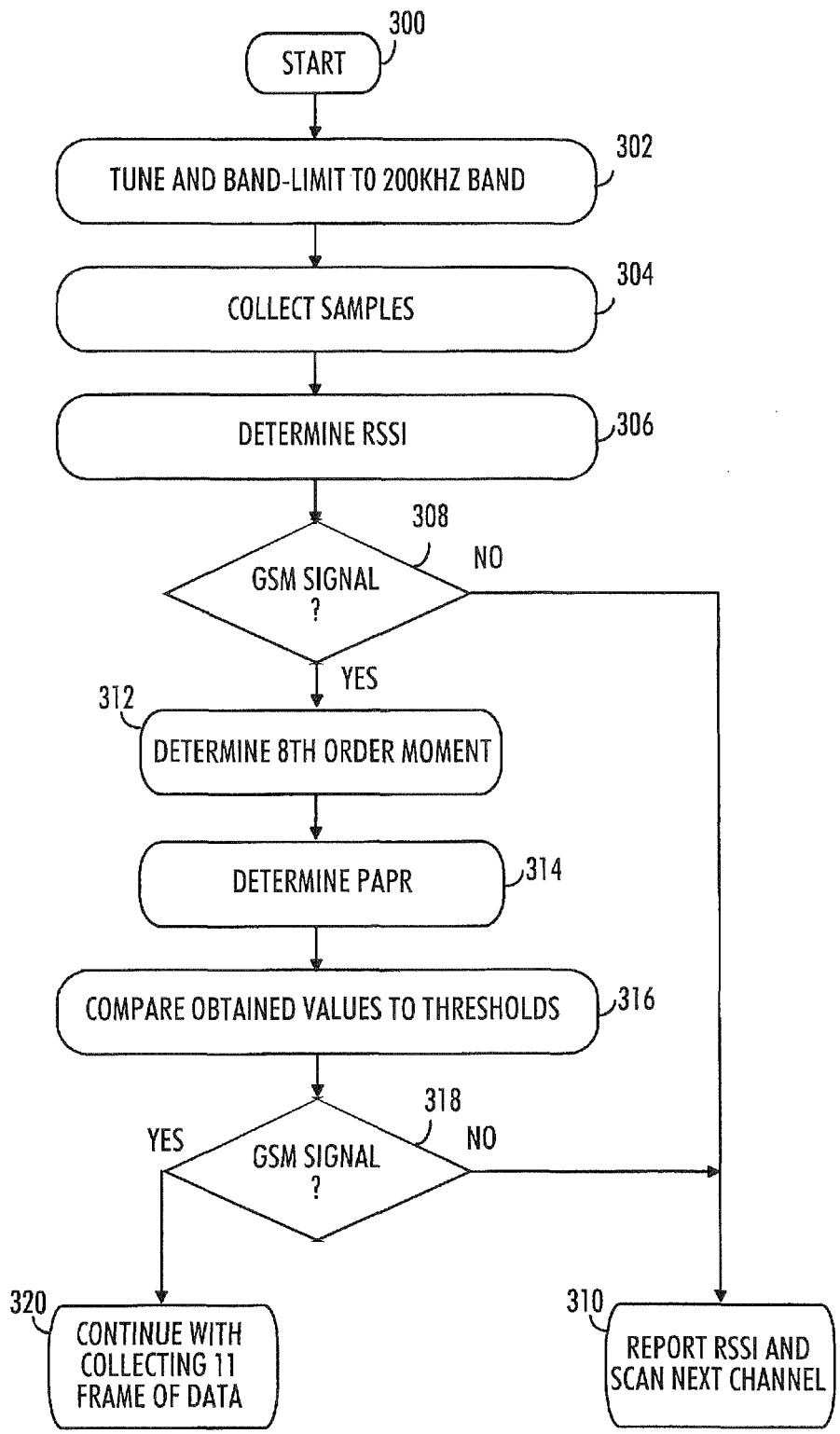

FIG. 3 is another flowchart illustrating an embodiment of the invention. The embodiment starts at step 300.

In step 302, a receiver is tuned to a channel and the bandwidth is limited to the GSM band width 200 kHz.

In step 304, a group of in phase and quadrature (I/Q) samples are collected for the length of one or two GSM frames.

In step 306, received signal strength indicator (RSSI) for the group of samples is determined.

In step 308, the RSSI is compared to a predetermined level. If the RSSI is below the given level it can be assumed that no GSM signal is present. In such a case the RSSI is reported and in some embodiments a message "No Sync Found" or "No Signal Above Threshold may be given. The process may continue in step 310 on a different channel. The noise floor in a 200 kHz bandwidth is typically around −114 dBm. A reasonable lower RSSI threshold of −110 dBm level can be used to speed up processing. Another value may be selected as well.

In step 312, $8^{th}$ order moment is determined for a group of samples of the input signal corresponding to the length of one or two frames of a Global System for Mobile communication (GSM) signal.

In step 314, peak to average power and peak to average power variance are determined for the group of samples of the input signal corresponding to the length of one or two frames of a GSM signal.

In step 316, the obtained $8^{th}$ order moment to predetermined thresholds and the obtained peak to average power and peak to average power variance are compared to predetermined thresholds.

In step 318, it is determined whether the input signal is a GSM-type signal on the basis of the comparisons.

If GSM type signal is not detected, the RSSI is reported and the process continues in step 310 on a different channel.

If GSM type signal is detected, the process continues by collecting data for 11 GSM frames and full BSIC decoding in step 320.

The combination of a short one or two frame collection with minimum threshold detection and GSM-like signal detection prior to a full 11-frame collection and FCCH/SCH search and BSIC decoding can dramatically speed up performance the GSM BSIC scanning procedure. The performance improvement results by short collections and minimum processing to identify signals which are either below a predefined threshold or not representative of a GSM signal if above the predefined threshold. Signals such as continuous waveform CW, CDMA, EVDO, WCDMA, WiMAX, and LTE which have different modulation types, bit rates, chip rates, etc will not exhibit GSM-like qualities and can therefore be rejected prior full 11-frame collection and processing. Overall performance improvement times will be a function of how many non-GSM carriers are in the signal environment. In the case of three CDMA carriers operating in a cellular or PCS band a full-band processing time could be reduced by 1.2 seconds.

If it is detected that a monitored channel does not comprise a GSM-like signal then the RSSI that was obtained as part of the detection process can be reported and the process may continue with the next channel or sequence of channels to be scanned. Speedup of significant portions of a frequency spectrum scanning can be provided since CDMA/EVDO/UMTS/LTE areas of the cellular/PCS bands will be processed much faster.

Embodiments of the invention utilise $8^{th}$ order moment when determining whether a monitored frequency channel comprises a GSM-like signal or not. In mathematics, moment is used to describe the shape of given set of points. For example, $1^{st}$ order moment describes the mean value of points and $2^{nd}$ order moment described variance. In general, the $n^{th}$ order moment of a real valued continuous function f(x) of a real variable about a value c is given by $$\mu'_n = \int_{-\infty}^{\infty}(x-c)^n f(x)dx.$$

In this case, the $8^{th}$ order moment is calculated from a group of samples of the input signal corresponding to the length of one or two frames of a GSM signal. The samples may be denoted as X=a+jb where a is the real part and b the quadrature part. In an embodiment, the $8^{th}$ order moment fm8 may be calculated from $$fm8 = \frac{\sum (a+jb)^8}{\text{num of samples}}$$

where the summation is over the samples.

The calculation of the term $(a+jb)^8$ may be performed by determining $4^{th}$ order terms expressed as $fm4i = a^4 + b^4 - 6a^2b^2$ for the real part and $fm4q\ 4a^3b - 4ab^3$ for the quadrature part.

and calculating the $8^{th}$ order terms fm8i and fm8q from $fm8i = fm4i^2 - fm4q^2$ for the real part and $fm8q = 2*fm4i*fm4q$ for the quadrature part and summing the terms over all samples.

In an embodiment, the $8^{th}$ order moment is computed on only the quadrature component of a down converted signal. In such a case, the real part for 8th order moment calculation equals to quadrature samples 0 to N-1 of samples and the imaginary part for $8^{th}$ order moment calculation equals quadrature samples 1 to N of the samples (same as real part but delayed or offset by one quadrature sample).

In this embodiment, the real and imaginary parts of the $8^{th}$ order moment use consecutive and delayed quadrature samples of the collected signal. Thus, the real samples are not used. However, this is purely an implementation issue. Either the real or quadrature samples may be used in a similar manner.

A slightly improved performance may be obtained by calculating both using only the real part of the collected signal and then only the imaginary part of the collected signal and finally taking averages or making other decisions on the two sets of $8^{th}$ order moment calculations. However, this increases the number of computations. A calculation using either real or quadrature part of samples minimizes computations and leads to a high scanning speed.

For a GSM signal the $8^{th}$ order moment value is normally within a given predetermined range and other signals are typically outside of the range. Empirical data may be used to selecting suitable threshold values for determining whether signal is a GSM signal or not.

Some false detection may occur due to noise but CDMA, EVDO, and adjacent channel GSM signals can be consistently classified as not GSM-like. At the boundary edges of the threshold range the number of signals incorrectly classified may increase slightly. The lower the threshold the better the valid GSM signal classification performance is while some CDMA, noise, and adjacent channels may also be classified as GSM-like signals.

Overall a substantial improvement in performance can be achieved by acquiring a short sample set followed by a decision on the collection and processing of the full eleven frames of data for GSM BSIC detection. The eleven frames of GSM signal required for identifying and decoding one SCH burst requires about 60 ms of data. The post-processing time has been shown to be around 40 ms per RF channel. A scan speed of about 10 scans per second would be achieved for every GSM RF channel scanned. For the PCS1900 band a 300 channel scan would take about 30 seconds using these metrics. However, by using a short data collect of one of two frames of data and performing a threshold and modulation recognition approach the 100 ms time for each channel is reduced to just a few ms. If only one valid GSM channel was in the 300 channel band scan the time would be reduced considerably. Using a metric of 10 ms for short data collect and decision-making versus 100 ms would realize a speed-up of from 30 seconds total to about 100 ms* 1ch+10 ms* 299 ch or 3.09 seconds. Since the procedure provides a 95% probability of detection these times may increase slightly. The threshold bias to minimize missing GSM-like signals may necessarily increase false detects on some CDMA signals. If 5% of the 300 channels are also fully processed then 15 additional channels may be detected as GSM-like modulations and necessarily be fully decoded resulting in cyclic redundancy check CRC error or No Synchronization channel SCH found. An approximate worst case scenario would be 100 ms * (1ch+15 ch)+10 ms *(300−16)=100 ms * 16+10 mc*284=1.6 s+2.84 s=4.44 seconds.

The overall scan speed-up expected is 30/4.44 or a factor of 6.75×. This is a significant speed-up in performance and enables the entire PCS1900 band to be scanned faster than other commercial scanners on the market which do not employ this novel approach.

The use of a modulation recognition technique like described above in a pre-screening data collect of short duration of one or two GSM TDMA frames can dramatically increase the overall GSM BSIC scan speed performance of a scanner operating in a multi-technology cellular mixed signal environment. The use of an algorithm based on constant modulus properties of a GSM signal and associated with peak-to-average power (PAPR) calculations can also incrementally increase performance by the further elimination of channels to be scanned following modulation recognition decisions. The use of constant modulus properties of a GSM signal to compute PAPR and PAPR variance can eliminate unnecessary long duration collects of up to eleven frames to capture a single SCH burst on a GSM control channel for BSIC decoding. The method divides the pre-screening short data collect into segments each of which provides a specific RSSI and associated PAPR and PAPR variance values for a given set of samples among the segments. By comparing the differences between the segmented RSSIs with a threshold of a predetermined value a decision is made as to whether the captured signal is a constant modulus signal such as GSM or not. If the signal captured is not categorized as a constant modulus signal throughout the short data capture then it is not a GSM control channel. Signals which are eliminated from further processing include the following:

Adjacent non-GSM control channels
GSM hopping traffic channels
CDMA/EVDO and other non-GSM signals which may pass the modulation recognition threshold
WCDMA (UMTS) signals which have a high PAPR value.

In an embodiment, for the constant modulus related RSSI, PAPR and PAPR variance calculations, one or two frames of data is collected where the data is sampled at 76.8 MHz/70 or 1097142.857 Hz. This sample rate is approximately 4.05× the GSM symbol rate of 270,833 Hz. One GSM TDMA frame is 4.615 ms or 5064 samples at 76.8 MHz/70 sample rate. Each segment in 4-segment constant modulus calculations is 1266 samples. Each segment in 8-segment constant modulus calculations is 633 samples.

It has been observed that a specific static modulation index threshold above which the PAPR and PAPR variance was disabled prevented mishandling strong GSM signals which may vary by more than +/−20% between segments. The elimination of signals below the static threshold of an 8th order moment was substantial and shows the use of PAPR and PAPR variance in addition to the moment statistic for modulation recognition for determination of GSM-like signals to be a performance improvement over using the moment only.

GSM signals provide a periodicity from the magnitude of the baseband data which repeats at the slot rate due to the guard interval. The negative-going signal excursions from the GSM guard intervals require the minimum to be computed using the average and maximum to remove the bias of the actual minimums. By computing a minimum from the average and maximum strong GSM that otherwise would appear similar to non-GSM signals with large segment variations signals will not be rejected.

In an embodiment, in order to determine whether there is a GSM signal on the monitored channel, the analysis of the samples look for constant modulation in a statistical sense. One or two GSM frames of the signal of the monitored channel signal are sectioned and the variances between them should not differ much if there is a GSM signal present but will differ significantly if non-GSM signals like CDMA, WCDMA, etc are present instead.

In an embodiment, peak to average power and peak to average power variance for the group of samples of the input signal corresponding to the length of one or two frames of a GSM signal are determined. In an embodiment, a number of variances are calculated over segments of the samples and the maximum value of the variances is determined and used in the calculations.

Figure 4:
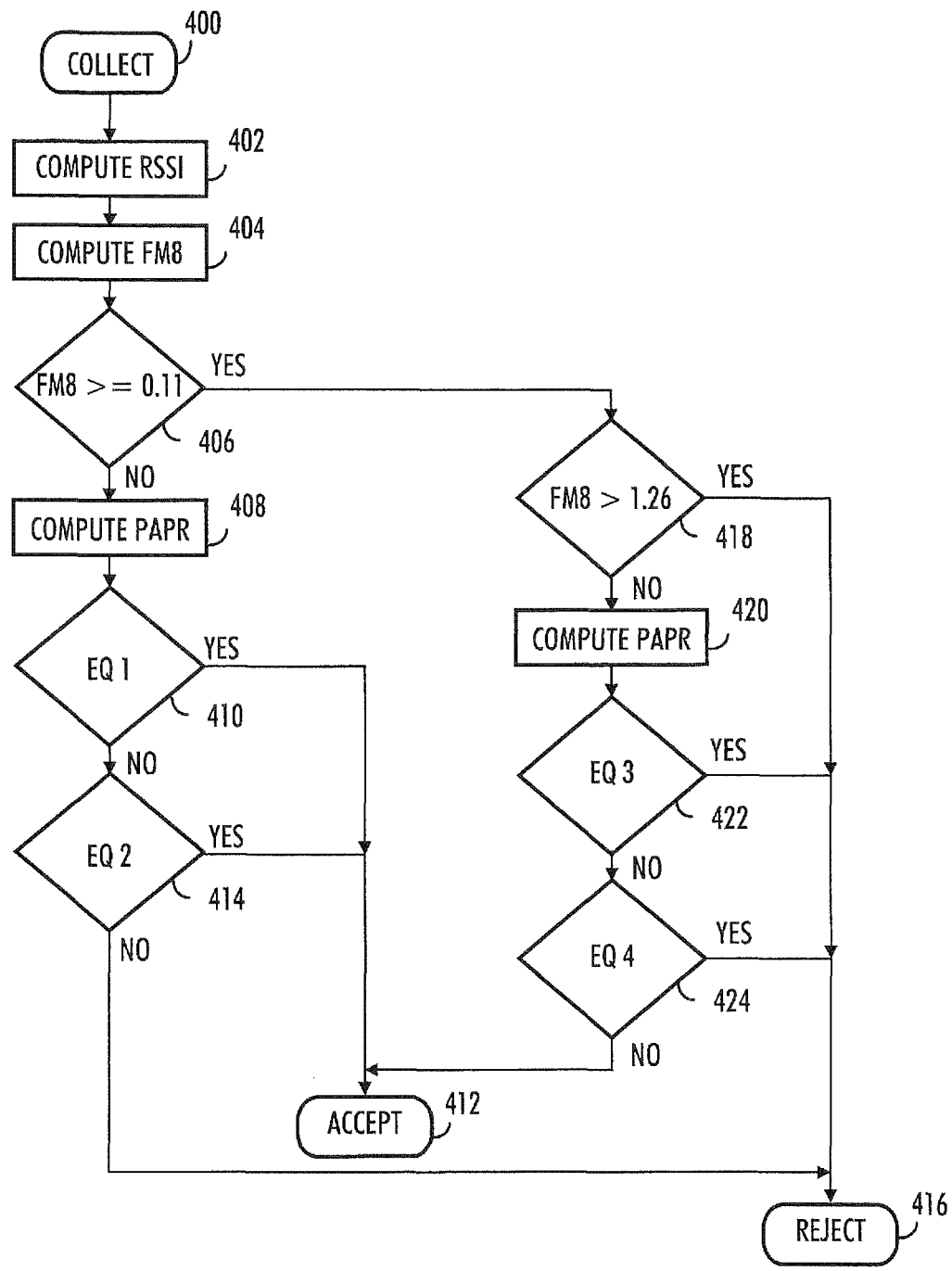
FIGS. 4 and 5 are flowcharts illustrating examples of embodiments of the invention.

FIG. 4 is a flowchart illustrating an embodiment of the invention.

In step 400, I/Q samples are collected of an input signal of a monitored channel, the number of samples corresponding to the length of one or two frames of a Global System for Mobile communication (GSM) signal.

In step 402, received signal strength indicator (RSSI) for the group of samples is determined.

In step 404, $8^{th}$ order moment is determined for a group of samples of the input signal corresponding to the length of one or two frames of a Global System for Mobile communication (GSM) signal.

In step 406, the determined $8^{th}$ order moment fm8 is compared to a given threshold value. An example of a suitable value is 0.11, which value has been determined empirically.

If the $8^{th}$ moment is larger or equal to 0.11, the process continues in step 418.

Otherwise the process continues in step 408 where peak to average power mean PAPR and variance PAPR VAR are determined for the group of samples of the input signal corresponding to the length of one or two frames of a GSM signal.

In step 410, it is tested whether $$fm8 > 0.056 \text{ AND } PAPR < 2.36 \text{ AND } PAPR\ VAR < 0.7. \qquad \text{(Eq. 1)}$$

If the test returns TRUE, then it can be accepted in step 412 that the monitored channel comprises a GSM-like signal.

If the test returns FALSE, it is tested in step 414 whether $$fm8 \geq 0.07 \text{ AND } PAPR < 2.26 \text{ AND } PAPR\ VAR < 0.5. \qquad \text{(Eq. 2)}$$

If the test returns TRUE it can be accepted in step 412 that the monitored channel comprises a GSM-like signal.

If the test returns FALSE it can be determined in step 416 that the monitored channel does not comprise a GSM-like signal.

In step 418, fm8 is compared to a given threshold value 1.26. If fm8>1.26 then it can be determined in step 416 that the monitored channel does not comprise a GSM-like signal.

Otherwise, the process continues in step 420 where peak to average power mean PAPR and variance PAPR VAR are determined for the group of samples of the input signal corresponding to the length of one or two frames of a GSM signal.

In step 422, it is tested whether $$PAPR > 2.36. \quad (Eq. 3)$$

If the test returns TRUE it can be determined in step 416 that the monitored channel does not comprise a GSM-like signal.

If the test returns FALSE, it is tested in step 424 whether $$PAPR\ VAR > 1.0. \quad (Eq. 4)$$

If the test returns TRUE it can be determined in step 416 that the monitored channel does not comprise a GSM-like signal.

If the test returns FALSE it can be accepted in step 412 that the monitored channel comprises a GSM-like signal.

In an embodiment, the above described procedure may be enhanced. An enhanced procedure includes a recovery mechanism to prevent rejection of GSM-like signals under certain circumstances. Using synchronous slot integration over 4 slots followed by a pseudo carrier-to-noise (CINR) calculation and some additional decisions, valid GSM signals which were previously rejected can be recovered and accepted for the full eleven frame processing to decode the GSM BSIC.

Figure 5:
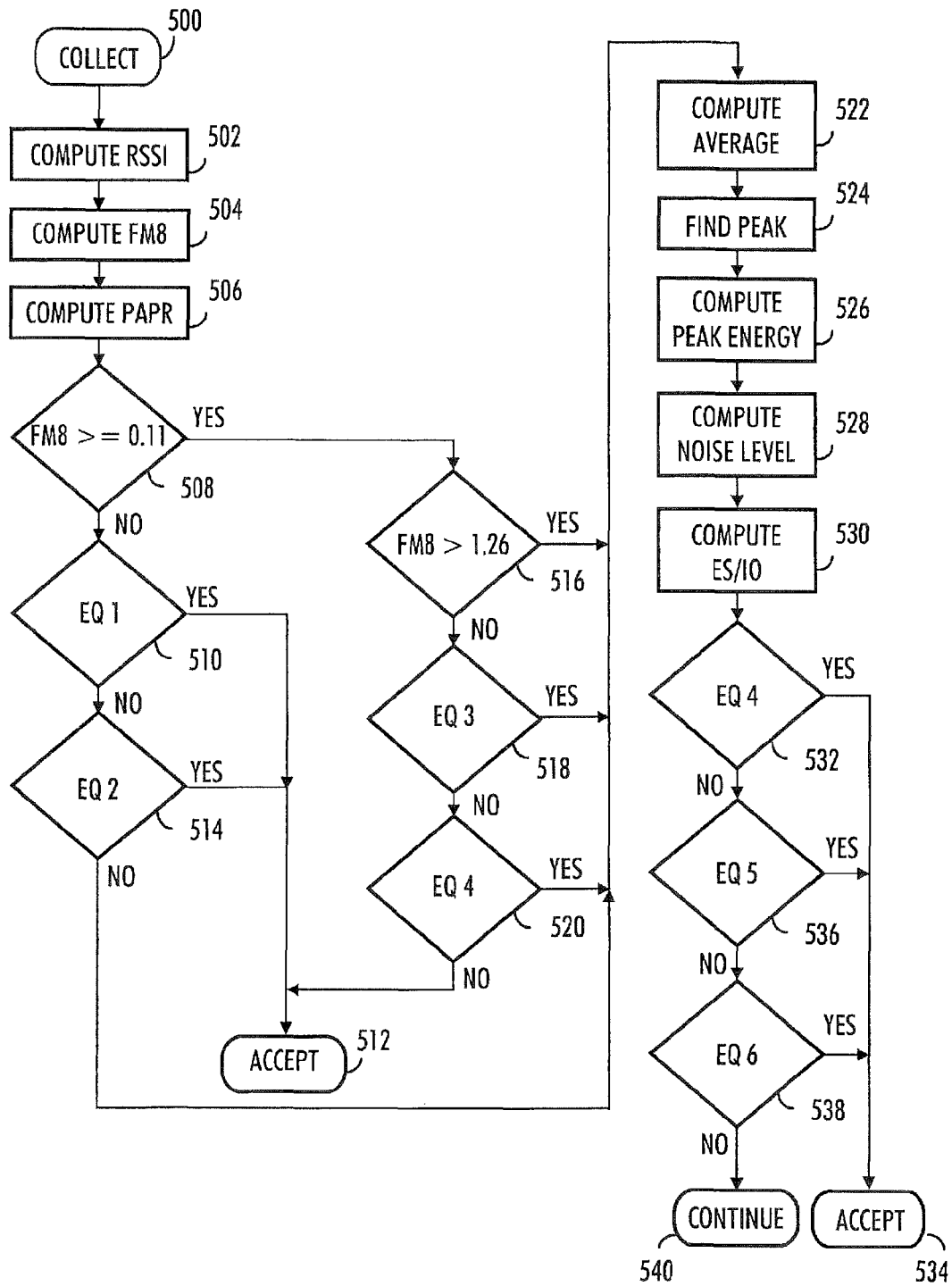

FIG. 5 is a flowchart illustrating an embodiment of the invention. The steps 500 to 520 are similar to the steps disclosed in FIG. 4.

In step 500, I/Q samples are collected of an input signal of a monitored channel, the number of samples corresponding to the length of one or two frames of a Global System for Mobile communication (GSM) signal.

In step 502, received signal strength indicator (RSSI) for the group of samples is determined.

In step 504, $8^{th}$ order moment fm8 is determined for a group of samples of the input signal corresponding to the length of one or two frames of a Global System for Mobile communication (GSM) signal.

In step 506, peak to average power mean PAPR and variance PAPR VAR are determined for the group of samples of the input signal corresponding to the length of one or two frames of a GSM signal.

In step 508, the determined $8^{th}$ order moment fm8 is compared to a given threshold value. An example of a suitable value is 0.11, which value has been determined empirically.

If the $8^{th}$ moment is larger or equal to 0.11, the process continues in step 516.

Otherwise the process continues in step 510, where fm8, PAPR and PAPR VAR are tested according to the Equation 1 defined above:

$$fm8 > 0.056\ AND\ PAPR < 2.36\ AND\ PAPR\ VAR < 0.7.$$

If the test returns TRUE, then it can be accepted in step 512 that the monitored channel comprises a GSM-like signal.

If the test returns FALSE, in step 514 fm8, PAPR and PAPR VAR are tested according to the Equation 2 defined above:

$$fm8 \geq 0.07\ AND\ PAPR < 2.26\ AND\ PAPR\ VAR < 0.5.$$

If the test returns TRUE it can be accepted in step 512 that the monitored channel comprises a GSM-like signal.

If the test returns FALSE the process continues in step 522.

In step 516, fm8 is compared to a given threshold value 1.26. If fm8>1.26 the process continues in step 522.

Otherwise, the process continues in step 518 where PAPR is tested according to Equation 3, or PAPR>2.36.

If the test returns TRUE the process continues in step 522.

If the test returns FALSE, it is tested in step 520 whether $$PAPR\ VAR > 1.4. \quad (Eq. 5)$$

If the test returns TRUE the process continues in step 522.

If the test returns FALSE it can be accepted in step 512 that the monitored channel comprises a GSM-like signal.

In following steps, CINR is calculated and utilised in determining whether a GSM-like signal there exists although the $8^{th}$ order moment did not detect any such signal. In following, all numerical values are given merely as illustrative examples.

In step 522, slot synchronous average is computed. In an embodiment, the inverse magnitude of the average of 4 slots of 633 samples at 4.05× sample rate is computed.

In step 524, slot peak is determined.

In step 526, signal energy centered over peak (guard interval) using 21-30 sample window is determined.

In step 528, average signal outside of window is determined, thus obtaining average noise energy.

In step 530, pseudo CINR or Es/Io is computed as 20*log10(signal energy/noise energy).

In step 532, it is tested whether $$fm8 > 1.0\ AND\ fm8 < 1.3\ AND\ PAPR\ VAR < 0.1. \quad (Eq.5)$$

If the test returns TRUE, it can be accepted in step 534 that the monitored channel comprises a GSM-like signal.

Otherwise, it is tested in step 536 whether $$fm8 < 1.26\ AND\ fm8 \geq 0.032\ AND\ Es/Io > Threshold\ 1\ AND\ PAPR\ VAR\ max \leq 2.54 \quad (Eq.6)$$

where $Threshold1 = 10^{(4.3/84.48)} = 1.124345$.

If the test returns TRUE, it can be accepted in step 534 that the monitored channel comprises a GSM-like signal.

Otherwise, it is tested in step 538 whether $$Es/Io > Threshold2\ AND\ PAPR\ VAR \leq 0.8 \quad (Eq.7)$$

where $Threshold2 = 10^{(10.0/84.48)} = 1.313322$.

If the test returns TRUE, it can be accepted in step 534 that the monitored channel comprises a GSM-like signal.

If the test returns FALSE it can be accepted in step 540 that the monitored channel does no comprise a GSM-like signal.

GSM signals are periodic from slot to slot in that 156.25 bits are transmitted with an 8.25 bit guard interval. Normally there is no transmission during the guard interval. Averaging over several slots reveals the constant magnitude of the signal and also reveals the guard intervals since they will be synchronously averaged, overlap and tend toward zero. The inverse magnitude calculated in step 522 will produce the periodic peak which is the guard interval. This peak is used to determine a pseudo-CINR measurement and along with other decisions to reinstate a signal as GSM-like which may have been rejected by other criteria. A GSM-signal will have a dominant magnitude which when inverted reveals significant energy during the guard interval. For strong GSM signals when other decisions such as 8th order moment or PAPR may reject the signal the pseudo-CINR will overrule the rejection status and accept the signal.

Let us further study the enhanced procedure described above.

In the proposed novel approach for rapid scanning a new concept of slot synchronization is proposed which is obtained by exploiting periodicities within the GSM signal structure. A GSM signal consists of 8 slots per sub frame. For BSIC decoding we are only interested in slot 0. Both the FCCH and SCH bursts occur in slot 0 exactly separated by one sub frame.

In an embodiment, the proposed solution exploits the GSM signaling structure to expose the unique GSM periodicities where the guard, corresponding tail bits, and/or various burst sequence slot intervals occur. By selectively using only a few slots or frames of data GSM slot synchronization can be obtained for a multiplicity of purposes. These include GSM signal identification and obtaining an index for GSM burst type searches using the appropriate training sequence for a given burst type. Once GSM slot synchronization is obtained the signal can be accepted or rejected as being a GSM signal for further processing. In an embodiment, one or two frames of data of a receive signal can be collected in a pre-processing stage and examined for GSM slot sync in addition to using a 8th order moment modulation recognition techniques including the peak-to-average power (PAPR) to identify the signal as GSM or not. Once the signal is identified as a GSM signal in the short pre-processing the longer collection of up to 11 frames of data for the decoding of SCH or other GSM bursts can be executed.

The specific algorithm which aids to exploit the periodicity of the guard interval may be realized as magnitude computation followed by a sliding summer. The primary goal is to keep the processing as simple as possible so as not to add additional complexity and processing time to the entire SCH burst detection processing. Additionally it was found that a delay-line correlator followed by synchronous integration in a slot-wise timing epoch could also be used to reduce other signal components especially in cases where the RSSI is weak.

In GSM, the periodicity of the guard interval is once per 156.25 bits. If the delay in the delay-line correlator is 156.25× samples/bit then the guard period will be correlated and accumulate while other signal components will diminish. However, since the guard interval has no useful energy no real correlation gain is provided. Some noise reduction may occur while the non-linear process may actually add some noise.

It was also found that a delay-line correlator could also be used to target the tail bits which are 3 bits in duration. It was found that this approach would also work but did not have the signal power on weak signals versus the guard interval which is 8.25 bits in duration and also the time during which no power is transmitted.

The use of a magnitude computation over at least 4 slots (½ frame) followed by a sliding summer and peak sort to identify the starting point with a specified search window defined by the RSSI was sufficient although other numerical values may be applied as well.

Figure 6:
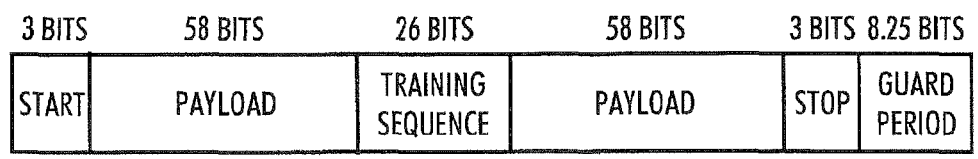
FIG. 6 illustrates an example of a GSM burst structure.

There are four different types of bursts used for transmission in GSM. The normal burst is used to carry data and most signaling. It has a total length of 156.25 bits, made up of two 57 bit information bits, a 26 bit training sequence used for equalization, 1 stealing bit for each information block (used for FACCH), 3 tail bits at each end, and an 8.25 bit guard sequence, as shown in FIG. 6. The 156.25 bits are transmitted in 0.577 ms, giving a gross bit rate of 270.833 kbps.

The F burst, used on the FCCH, and the S burst, used on the SCH, have the same length as a normal burst, but a different internal structure, which differentiates them from normal bursts (thus allowing synchronization). The access burst is shorter than the normal burst, and is used only on the RACH.

If the various slots in the GSM signal structure are overlapped various bursts will occur. However, the guard interval will always overlap and be dominant.

Although we are interested in the SCH burst type for BSIC decoding this slot synchronization concept and technique can be used to operate a matched filter on any of the GSM burst type training sequences and decode them as well.

Speed improvements in scans per second over using 8th order moment procedure and the enhanced procedure are tabulated below:

| Procedure | Full-band cellular | Full-band PCS1900 |
|---|---|---|
| Fm8 alone | 0.3 | 0.3 |
| Enhanced | 0.9 | 0.5 |

Thus, for Full-band cellular (US 850 MHz band) with 125 channels the $8^{th}$ order moment procedure gives 0.3*125=37.5 channels per second and the enhanced procedure 0.9*125=112.5 channels per second.

The overall speedup in the PCS1900 can be explained since there are CDMA, EVDO, and GSM traffic channels in the PCS1900 band. The more dramatic speedup in the cellular band is explained by the existence of only CDMA and EVDO signals which are more easily rejected based on the PAPR and PAPR variance thresholds in addition to the 8th order moment.

In all cases the use of the various metrics and thresholds is statistical and becomes more inconsistent at lower signal-to-noise levels. For GSM signal, it was observed that −104 to −108 signals had a wide range of values due to noise. Additional parameters such a power-delay profile vs frequency and bit rate detectors could improve performance but at an increased computational cost. If the 8th order moment, PAPR, PAPR variance, bit rate detectors, and spectral profile were computed in an field-programmable gate array FPGA overall performance and speed could be improved.

Empirical evidence has demonstrated that the proposed procedures of using the modulation recognition technique to dramatically improve GSM BSIC scan rates. Testing was performed using a matlab program and real-time DSP firmware on collected I-Q samples of cellular signals collected over-the-air which have been band-limited to 200 kHz. Cellular and PCS band signals were collected and processed using 2450 I-Q sample pairs and computing the 8th order moment. The results were compared to a threshold obtained and adjusted towards high sensitivity of GSM signals. The results clearly show that CDMA, EVDO, noise, hopping GSM signals, and adjacent GSM control channel signals are not detected as GSM and avoid the test for full 11 frame collects and BSIC decode processing. The scan performance would be dramatically improved by over 5× existing performance for full-band scans where both GSM, CDMA, and EVDO signals coexist in the cellular environment. Performance was also tested with a Rhode & Schwarz CMD53 GSM Cellular Test Set to show proper GSM signal detection performance from −50 dB to −110 dB.

Modulation recognition alone may pass some GSM traffic channels but the PAPR procedure will reject them. PAPR procedure alone seems to work quite well in an all GSM signaling environment to sort traffic channels from control channels. A hopping GSM traffic channel was correctly rejected using the PAPR procedure but would have been accepted using modulation recognition criteria alone.

Modulation recognition alone may pass some EVDO channels but the PAPR procedure will reject them. PAPR procedure alone seems to work quite well in EVDO signaling environment to reject signals from further processing during a pre-screen short collection.

Figure 7:
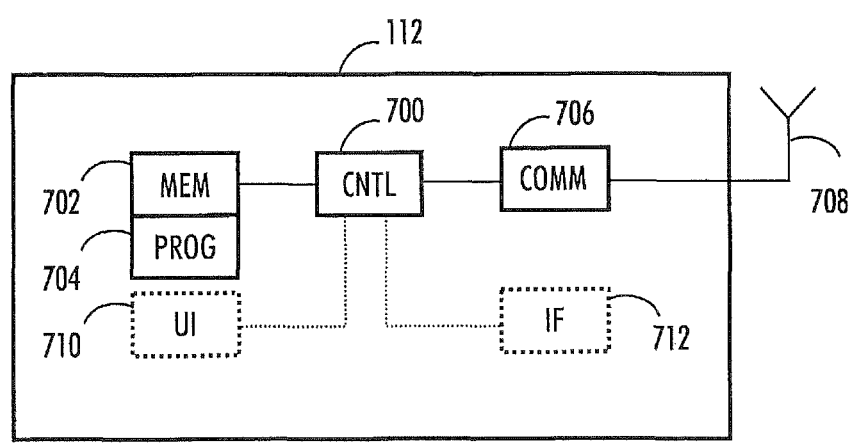
FIG. 7 illustrates an example of an apparatus.

FIG. 7 illustrates an embodiment. The figure illustrates a simplified example of an apparatus 112 applying embodiments of the invention. In some embodiments, the apparatus may be an eNodeB or user equipment of a communications system. The apparatus may further be a measurement or analyzing device, a scanner or any other kind of device configured to receive transmissions from base stations or user equipment of communication systems. The apparatus may be a standalone device or it may be connectable to other devices such as personal computers, analyzers or other devices.

The apparatus may also be interpreted as a circuitry implementing the required functionality within an eNodeB or user equipment of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 700 configured to control at least part of the operation of the apparatus.

The apparatus may comprise a memory 702 for storing data. Furthermore the memory may store software 704 executable by the control circuitry 700. The memory may be integrated in the control circuitry.

The apparatus comprises a transceiver 706. The transceiver is operationally connected to the control circuitry 700. It may be connected to an antenna arrangement 708.

The software 704 may comprise a computer program comprising program code means adapted to cause the control circuitry 700 of the apparatus to control the apparatus to obtain as an input a sampled signal; determine $8^{th}$ order moment for a group of samples of the input signal corresponding to the length of one or two frames of a Global System for Mobile communication (GSM) signal; determine peak to average power and peak to average power variance for the group of samples of the input signal corresponding to the length of one or two frames of a GSM signal; compare the obtained $8^{th}$ order moment to predetermined thresholds and the obtained peak to average power and peak to average power variance to predetermined thresholds and determine whether the input signal is a GSM-type signal on the basis of the comparisons.

The apparatus may further comprise interface circuitry 712 configured to connect the apparatus to other devices and network elements of communication system, for example to core. This applies especially if the apparatus is an eNodeB or a base station or respective network element. The interface may provide a wired or wireless connection to the communication network. The apparatus may be in connection with core network elements, eNodeB's, Home NodeB's and with other respective apparatuses of communication systems.

The apparatus may further comprise user interface 710 operationally connected to the control circuitry 700. The user interface may comprise a display, a keyboard or keypad, a microphone and a speaker, for example. This applies especially if the apparatus is user equipment or respective network element.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

The invention claimed is:

1. An apparatus comprising at least one processor configured to cause the apparatus:
    obtain as an input a sampled signal;
    determine an $8^{th}$ order moment for a group of samples of the input signal corresponding to a length of one or two frames of a Global System for Mobile communication (GSM) signal;
    determine peak to average power and peak to average power variance for the group of samples of the input signal corresponding to the length of one or two frames of a GSM signal;
    compare the obtained $8^{th}$ order moment to predetermined thresholds and the obtained peak to average power and peak to average power variance to predetermined thresholds;
    determine whether the input signal is a GSM-type signal on the basis of the comparisons.

2. The apparatus of claim 1, at least one processor further configured to cause the apparatus
    determine inverse magnitude of signal energy over a number of samples, the number of samples corresponding to a given number of GSM slots;
    determine a peak value in the inverse magnitude of signal energy;
    determine signal energy using a sample window centered over a peak value;
    determine average energy outside the sample window;
    calculate signal to noise ratio on the basis of the determined signal energy and average energy;
    determine whether the input signal is a GSM-type signal on the basis of the comparisons.

3. The apparatus of claim 1, the apparatus being configured to
    determine received signal strength indicator for the group of samples of the input signal corresponding to the length of one or two frames of a GSM signal prior determining the $8^{th}$ order moment for the group of samples.

4. The apparatus of claim 3, the apparatus being configured to compare the determined received signal strength indicator to a given threshold
    determine whether the input signal is a GSM-type signal on the basis of the comparison, and output the determined received signal strength indicator and start analysing next group of samples.

5. An apparatus, comprising:
    means for obtaining as an input a sampled signal;
    means for determining an $8^{th}$ order moment for a group of samples of the input signal corresponding to a length of one or two frames of a Global System for Mobile communication (GSM) signal;
    means for determining peak to average power and peak to average power variance for the group of samples of the input signal corresponding to the length of one or two frames of a GSM signal;
    means for comparing the obtained $8^{th}$ order moment to predetermined thresholds and the obtained peak to average power and peak to average power variance to predetermined thresholds;
    means for determining whether the input signal is a GSM-type signal on the basis of the comparisons.

6. A method for recognizing Global System for Mobile communication (GSM) signals, the method comprising:
    obtaining as an input a sampled signal;
    determining an $8^{th}$ order moment for a group of samples of the input signal corresponding to a length of one or two frames of a GSM signal;
    determining peak to average power and peak to average power variance for the group of samples of the input signal corresponding to the length of one or two frames of a GSM signal;
    comparing the obtained $8^{th}$ order moment to predetermined thresholds and the obtained peak to average power and peak to average power variance to predetermined thresholds;
    determining whether the input signal is a GSM-type signal on the basis of the comparisons.

7. The method of claim 6, further comprising:
    determining inverse magnitude of signal energy over a number of samples, the number of samples corresponding to a given number of GSM slots;
    determining a peak value in the inverse magnitude of signal energy;
    determining signal energy using a sample window centered over a peak value;
    determining average energy outside the sample window;
    calculating signal to noise ratio on the basis of the determined signal energy and average energy;
    determining whether the input signal is a GSM-type signal on the basis of the comparisons.

8. The method of claim 6, further comprising:
    determining received signal strength indicator for the group of samples of the input signal corresponding to the length of one or two frames of a GSM signal prior determining the $8^{th}$ order moment for the group of samples.

9. The method of claim 8, further comprising:
    comparing the determined received signal strength indicator to a given threshold
    determining whether the input signal is a GSM-type signal on the basis of the comparison, and output the determined received signal strength indicator and start analysing next group of samples.

10. A computer program product embodied on a non-transitory distribution medium readable by a computer and comprising program instructions which, when loaded into an apparatus, execute a computer process comprising:
    obtaining as an input a sampled signal;
    determining an $8^{th}$ order moment for a group of samples of the input signal corresponding to a length of one or two frames of a GSM signal;
    determining peak to average power and peak to average power variance for the group of samples of the input signal corresponding to the length of one or two frames of a GSM signal;
    comparing the obtained $8^{th}$ order moment to predetermined thresholds and the obtained peak to average power and peak to average power variance to predetermined thresholds;
    determining whether the input signal is a GSM-type signal on the basis of the comparisons.

* * * * *